United States Patent Office 3,551,476
Patented Dec. 29, 1970

3,551,476
3-(HYDROXYPHENYL)-4-AMINOVALERATES
Meyer Sletzinger, North Plainfield, and George Gal, Summit, N.J., assignors to Merck & Co., Inc., Rahway, N.J., a corporation of New Jersey
No Drawing. Filed Apr. 11, 1968, Ser. No. 720,485
Int. Cl. C07c 101/18
U.S. Cl. 260—471                        4 Claims

ABSTRACT OF THE DISCLOSURE 3-(hydroxyphenyl)-4-aminovalerate esters are cyclized by treatment with alkali metal ferricyanides or nitrosodisulfonates to form 5-hydroxy-2-methylindolyl-3-acetic acids. When the amino group in the valerate is acylated, the acyl radical appears on the 1-position of the indole. The 5-hydroxy group is then methylated with any standard methylating agent. The process, when the acyl group is p-chlorobenzoyl, gives esters of indomethacin, active as anti-inflammatory compounds.

---

This invention relates to a method of preparing certain indolylacetic acid esters. More particularly, it relates to a new method of preparing certain 2-methyl-5-hydroxy-3-indolylacetic acid esters. It relates further to a method whereby certain aminovaleric acid derivatives are converted to 1-p-chlorobenzoyl-2-methyl-5-methoxy-3-indolylacetic acid, represented by the Formula I:

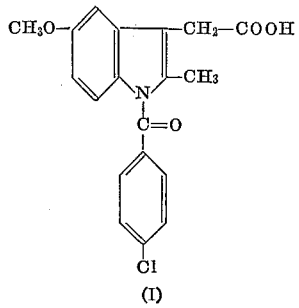

(I)

This compound is disclosed and claimed in U.S. Pat. 3,161,654, issued Dec. 15, 1964, to Shen.

In the Shen patent, 1-p-chlorobenzoyl-2-methyl-3-indolylacetic acids are prepared by a series of reactions in which 2-methyl-3-indolylacetic acids are dehydrated to the corresponding anhydrides; the anhydrides are treated with t-butyl alcohol to give the corresponding esters; the t-butyl esters are then acylated at the 1-position with p-chlorobenzoyl chloride; and the resulting 1-acylates are converted to free acetic acid derivatives by a pyrolysis process.

It is an object of this invention to provide a new method for obtaining the compounds of Formula I. It is a further object to provide a method whereby the compound of Formula I can be obtained from new aminovaleric acid intermediates. Other objects will become apparent hereinafter.

In accordance with this invention, it has been discovered that 3-(hydroxyphenyl)-4-aminovalerates of the Formula II:

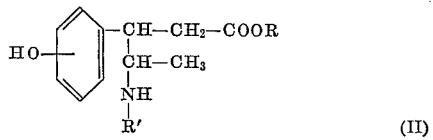

(II)

wherein R is lower-alkyl, e.g., methyl or t-butyl, or aralkyl, e.g., monocyclic ar(lower-alkyl) such as benzyl or phenethyl and R' is hydrogen or p-chlorobenzoyl, can be cyclized to yield a 5-hydroxy substituted indole of the Formula III:

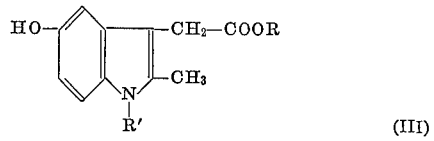

(III)

wherein R and R' are as above defined. Cyclization is effected by treatment with an alkali metal ferricyanide (e.g., potassium ferricyanide) or a nitrosodisulfonate of the Formula IV:

$NO(SO_3X)_2$   (IV)

wherein X is sodium, potassium or lithium. The reaction is conducted by mixing the reactants in the proportion of 1 to 4 moles of ring closing agent per mole of the compound of Formula II. Solvents which may be used are tetrahydrofuran, $H_2O/CHCl_3$ or

0.5–1 N $CH_3COOH/CHCl_3$

Other water-immiscible solvents in which the product is soluble may be substituted for chloroform. Examples of these are $CH_2Cl_2$, $CCl_4$, benzene, toluene, ethylacetate, etc. The temperature at which the reaction is conveniently effected is in the range of 0° to 20°, although it is possible to conduct the reaction at any temperature between the freezing and the boiling point of the reaction mixture. After the reaction has been completed in 1 to 15 minutes, the product of Formula III may be separated by concentration of the organic phase after the separation of the aqueous layer.

By treatment of compounds of Formula III with a methylating agent capable of converting the 5-hydroxy group to a 5-methoxy group, 2-methyl-5-methoxy-3-indolylacetic acid esters of the Formula V:

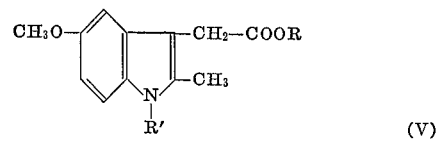

(V)

are obtained. The methylation is accomplished by mixing a compound of Formula III with the methylating agent and allowing the reaction mixture to stand either at ambient temperature or at elevated temperatures until the desired reaction has been achieved. The desired product may be recovered by conventional procedures involving evaporation of the solvent from the product or filtration if the product is obtained as a precipitate in the reaction mixture. If it is desired, the product may be further purified after recovery by conventional recrystallization procedures, using, for example, a lower alkanol as the recrystallization solvent. Among the suitable methylating agents for practicing the methylation process are methyl orthocarbonate, a di-alkyl formamide dimethyl acetal (e.g., dimethylformamide dimethyl acetal), ethereal diazomethane, a methyl halide such as methyl chloride, dimethyl sulfate, dimethyl sulfonate, aryl methyl sulfonate or methyl tosylate. Methylation with the foregoing reagents is accomplished in the presence of a basic material such as an alkali metal hydride, an alkali metal hydroxide or an anion exchange resin in the OH⁻ cycle.

The product of Formula V wherein R' is hydrogen is converted to the desired compound of Formula I by sequential acylation at the 1-position and de-esterification of the 3-side chain. Acylation is accomplished by treatment with an equimolar amount of p-chlorobenzoyl halide or p-chlorobenzoic acid anhydride in the presence of an organic base such as pyridine. Normally the reaction is conducted with cooling to a temperature in the range of 10° to 15° C. The acylated product may be isolated by acidification, extraction with ether, drying of the extract and concentration to dryness. Recrystallization of the residue from a solvent such as t-butanol gives the pure material which is the same as the compound of Formula V wherein R is p-chlorobenzoyl. The latter can be de-esterified by any of several different routes. For example, if R is an alkyl group such as t-butyl-de-esterification is effected by refluxing with p-toluene sulfonic acid until the evolution of isobutylene ceases. On the other hand, if R is methyl, de-esterification can be effected by treatment with a combination of lithium iodide and 2,6-lutidine. When R is an aralkyl group such as benzyl, de-esterification can be effected by hydrogenolysis until a theoretical amount of hydrogen is absorbed.

Starting materials for the process of the present invention, i.e., the aminovalerates of Formula II, are new compounds which can be prepared by condensation of ethyl bromoacetate with 2 - benzylamino-2'-methoxypropiophenone followed by demethylation and ring closure to 4-(alpha-benzylamino)-ethyl-cumarin. Base hydrolysis of the cumarin gave 3-(2'-hydroxyphenyl)-4-benzylaminopent-2-enoic acid which after esterification was reduced to the corresponding 3-(2'-hydroxyphenyl)-4-aminovalerate. The corresponding 4-p-chlorobenzamido derivatives are obtained by treatment of the amino compound with p-chlorobenzoic acid anhydride.

The following examples are presented to further illustrate the present invention.

EXAMPLE 1

(A) Preparation of methyl 2-methyl-5-hydroxy-3-indolylacetate using potassium nitrosodisulfonate To a solution of 0.1 mole of methyl-3-(2'-hydroxyphenyl)-4-aminovalerate in 300 ml. of 2 N acetic acid was added 200 ml. of methylene chloride. The resulting two-phase mixture was stirred vigorously under nitrogen and a solution of 0.2 mole of freshly prepared potassium nitrosodisulfonate in 250 ml. of water was added all at once and the stirring was continued for 5 minutes. The organic phase was separated, washed with water, dried over $MgSO_4$ and concentrated in vacuo to yield methyl-2-methyl-5-hydroxy-3-indolylacetate.

(B) Preparation of ethyl 2-methyl-5-hydroxy-3-indolylacetate using potassium ferricyanide A solution of 1.0 g. of ethyl-3-(5'-hydroxyphenyl)-4-p-chlorobenzoylaminovalerate in 50 ml. of tetrahydrofuran is added slowly to a stirred solution of 2.0 g. potassium ferricyanide in 50 ml. of water. After 2 hours stirring at room temperature, the percipitated ethyl-1-p-chlorobenzoyl - 2-methyl-5-hydroxyindole-3-acetate is filtered, washed with water, and dried in vacuo.

EXAMPLE 2

Preparation of benzyl 2-methyl-5-hydroxy-3-indolylacetate using sodium nitrosodisulfonate To a solution of 0.1 mole of benzyl-3-(2'-hydroxyphenyl)-4-aminovalerate hydrochloride in 250 ml. of water, containing 20 g. of acetic acid was added 200 ml. of chloroform. The mixture was stirred under nitrogen and a solution of 0.4 mole of freshly prepared potassium-nitroso-disulfonate in 500 ml. of water was added in one portion. After 3 minutes, the chloroform layer was separated, washed with water, dried over $MgSO_4$ and concentrated to dryness to give benzyl-2-methyl-5-hydroxy-3-indolylacetate.

EXAMPLE 3

Preparation of t-butyl 2-methyl-5-hydroxy-3-indolylacetate

To a solution of 0.1 mole of t-butyl-3-(2'-hydroxyphenyl)-4-aminovalerate in 250 ml. of 2 N acetic acid was added 200 ml. of methylene chloride. The mixture was stirred under nitrogen and a solution of 0.15 mole of freshly prepared potassium nitrosodisulfonate in 250 ml. of water was added in one portion and the stirring was continued for 15 minutes. The organic phase was separated, washed with water, dried, concentrated in vacuo to give t-butyl-2-methyl-5-hydroxy-3-indolylacetate.

EXAMPLE 4

Preparation of methyl 2-methyl-5-methoxy-3-indolylacetate

A solution of 0.1 mole of methyl 2-methyl-5-hydroxy-3-indolylacetate in 50 ml. of methylene chloride is treated with an equimolar amount of dimethylformamide dimethyl acetal for 2 days at room temperature. The solvent is evaporated and the product methyl 2-methyl-5-methoxy-3-indolylacetate is washed with water and dried. Recrystallization from t-butanol affords the product in pure form.

EXAMPLE 5

Preparation of benzyl 2-methyl-5-methoxy-3-indolylacetate

A solution of benzyl 2-methyl-5-hydroxy-3-indolylacetate (0.1 mole) in 50 ml. of dimethylformamide is treated with 2 equivalents of sodium hydride and one equivalent of methyl iodide is then added. After 10 minutes the reaction mixture is poured into 200 ml. of water containing one equivalent of hydrochloric acid. The product benzyl 2 - methyl-5-methoxy-3-indolylacetate precipitates, is filtered off, washed with water and then recrystallized from t-butanol.

EXAMPLE 6

Preparation of t-butyl 2-methyl-5-methoxy-3-indolylacetate

A mixture of 0.1 mole of t-butyl 2-methyl-5-hydroxy-3-indolylacetate and 50 ml. of methyl orthocarbonate is refluxed while slowly distilling methanol out of the mixture through a fractionating column. When one equivalent of methanol has been distilled out, the reaction product is cooled and evaporated in vacuo, leaving the product t-butyl 2-methyl-5-methoxy-3-indolylacetate. The latter is obtained in pure form by washing with water, drying over sodium sulfate and then recrystallizing from t-butanol.

EXAMPLE 7

Preparation of methyl 1-p-chlorobenzoyl-2-methyl-5-methoxy-3-indolylacetate

To a solution of 0.1 mole of methyl 2-methyl-5-methoxy-3-indolylacetate in 50 ml. of dry dimethylformamide was added a slurry of 10% molar excess of 50% sodium hydride emulsion in 25 ml. of dimethylformamide. The mixture was cooled to 30° C. and a 20% molar excess of p-chlorobenzoyl chloride was added. The mixture was aged for 2 hours and then cautiously decomposed by addition of acetic acid. The mixture was further diluted with water and extracted with chloroform. The chloroform extracts were dried and concentrated to give methyl 1-p-chlorobenzoyl-2-methyl-5-methoxy-3-indolylacetate.

EXAMPLE 8

Preparation of benzyl 1-p-chlorobenzoyl-2-methyl-5-methoxy-3-indolylacetate

To a solution of 0.1 mole of methyl 2-methyl-5-methoxy-3-indolylacetate in 50 ml. of dry dimethylformamide was added a slurry of 10% molar excess of 50% sodium hydride emulsion in 25 ml. of dimethylformamide. The mixture was cooled to 30° C. and a 20% molar excess of p-chlorobenzoyl chloride was added. The mixture was aged for 2 hours and then cautiously decomposed by addition of acetic acid. The mixture was further diluted with water and extracted with chloroform. The chloroform extracts were dried and concentrated to give benzyl 1-p-chlorobenzoyl-2-methyl-5-methoxy-3-indolylacetate.

EXAMPLE 9

Preparation of t-butyl 1-p-chlorobenzoyl-2-methyl-5-methoxy-3-indolylacetate

To a solution of 0.1 mole of t-butyl 2-methyl-5-methoxy-3-indolylacetate in 50 ml. of dry dimethylformamide was added a slurry of 10% molar excess of 50% sodium hydride emulsion in 25 ml. of dimethylformamide. The mixture was cooled to 30° C. and a 20% molar excess of p-chlorobenzoyl chloride was added. The mixture was aged for 2 hours and then cautiously decomposed by addition of acetic acid. The mixture was further diluted with water and extracted with chloroform. The chloroextracts were dried and concentrated to give t-butyl 1-p-chlorobenzoyl-2-methyl-5-methoxy-3-indolylacetate.

EXAMPLE 10

Preparation of 1-p-chlorobenzoyl-2-methyl-5-methoxy-3-indolylacetic acid

A well-stirred mixture of methyl 1-p-chlorobenzoyl-2-methyl-5-methoxy-3 - indolylacetate (0.01 mole), anhydrous lithium iodide (8.5 g.) and 200 ml. of freshly distilled 2,6-lutidine is refluxed under nitrogen for 8 hours. On cooling to room temperature, chloroform (100 ml.) and cold 2 N-hydrochloric acid (100 ml.) is added and after shaking, the layers are separated. The aqueous phase is back extracted with chloroform (50 ml.). The combined organic extracts are washed well with cold dilute hydrochloric acid (two times with 100 ml.) with water (two times with 100 ml.) and dried over magnesium sulfate. Removal of the solvent under reduced pressure affords 1 - p-chlorobenzoyl-2-methyl-5-methoxy-3-indolylacetic acid.

EXAMPLE 11

Preparation of 1-p-chlorobenzoyl-2-methyl-5-methoxy-3-indolylacetic acid

A solution of 0.05 g. of benzyl 1-p-chlorobenzoyl-2-methyl-5-methoxy-3-indolylacetate in 50 ml. of acetic acid is reduced at 25° C. under 40 p.s.i. of hydrogen, using 0.3 g. of 10% palladium-carbon catalyst. After 1 equivalent of hydrogen have been taken up, the solution is diluted with 50 ml. of acetic acid and then heated to 60°. The catalyst is removed by filtration, leaving the desired product in the filtrate. The product was obtained in pure form by recrystallization from benzene.

EXAMPLE 12

Preparation of 1-p-chlorobenzoyl-2-methyl-5-methoxy-3-indolylacetic acid

A solution of 5 g. of t-butyl 1 - p-chlorobenzoyl-2-methyl-5-methoxy-3-indolylacetate in 100 ml. of toluene containing 100 mg. of p-toluene sulfonic acid was refluxed until one equivalent of isobutylene was collected. The toluene solution was washed with water, dried and concentrated to give a residue of the product. Recrystallization of the latter from t-butanol afforded the product in pure form.

EXAMPLE 13

Preparation of methyl 3-(2'-hydroxyphenyl)-4-aminovalerate

Triphenylphosphine (0.1 mole) and ethylbromoacetate (0.102 mole) in 120 ml. benzene was kept at 50° C. for 60 hours, then cooled to 15° C. and the solid carbethoxymethyltriphenylphosphonium bromide was filtered off and washed with 10 ml. of benzene. The thus-obtained carbethoxymethyltriphenylphosphonium bromide was suspended in 70 ml. of anhydrous ether and a solution of phenyl lithium (0.1 mole) in ether was added.

To the resulting solution (carbethoxymethylene-triphenyl-phosphorane) was added 2-benzylamino-2'-methoxypropiophenone in 150 ml. of ether. After aging the reaction mixture for 3 hours, the precipitated triphenyloxide was filtered off and the filtrate was washed three times with 50 ml. of water, dried over Na$_2$SO$_4$ and concentrated in vacuo.

The crude ester was refluxed for 10 hours with 70 ml. of hydriodic acid (57%) and red phosphorus (15 g.), then diluted with water. The mixture was extracted three times with 50 ml. of benzene, the combined organic phase was washed with 5% sodium hydrosulfite solution, dried over Na$_2$SO$_4$ and concentrated in vacuo to give 4-(alpha-benzylamino)ethylcumarin.

10 g. of 4-(alpha-benzylamino)ethylcumarin was refluxed in 50 ml. of 10% alcoholic potassium hydroxide solution for 3 hours. The alcohol was removed in vacuo, the residue was dissolved in 100 ml. of water and the solution acidified with 10% hydrochloric acid to pH 4.0. The precipitated 3-(2' - hydroxyphenyl)-4-benzylaminopent-2-enoic acid was filtered, washed with water and dried in vacuo.

3 - (2' - hydroxyphenyl) - 4 - benzylaminopent-2-enoic acid (28.1 g.) was mixed with methylalcohol (96 g.), ethylene dichloride (150 ml.) and sulfuric acid (9.9 g.) and heated under reflux for a period of six hours. The reaction mixture was poured into 100 ml. of ice cold water and neutralized with sodium bicarbonate (pH 7–7.5). The organic phase was separated, washed with water, dried over MgSO$_4$ and concentrated in vacuo to give methyl - 3 - (2' - hydroxyphenyl)-4-benzylaminopent-2-enoate.

Methyl - 3(2' - hydroxyphenyl) - 4 - benzylaminopent-2-enoate (10.0 g.) was dissolved in 100 ml. of ethylacetate and hydrogenated over 10% Pd/C catalyst (1.0 g.) at room temperature until the theoretical amount (2 moles) of hydrogen absorbed. The catalyst was removed by filtration and the filtrate was concentrated in vacuo. This obtained methyl-3-(2'-hydroxyphenyl)-4-aminovalerate used as starting material for Example 1.

EXAMPLE 14

Preparation of benzyl 3-(2'-hydroxyphenyl)-4-aminovalerate

Benzylacetate (18.0 g.), sodium methoxide (6.60 g.) and methyl - 3 - (2' - hydroxyphenyl) - 4-aminovalerate (22.3 g.) were charged into a 50-ml. flask connected with a 2 inch long vacuum packed column, filled with helices. The column was connected with a reflux ratio controlled head and receiver. The reaction mixture was heated in an oil bath to reflux and the methylacetate was distilled and collected using a reflux ratio of 1:10. When no more methylacetate distilled over, the reaction mixture was cooled and the excess of benzylacetate was removed in vacuo. The residue was dissolved in water and saturated with carbon dioxide. The oily precipitate was dissolved in methylene chloride and washed with water. After drying, methylene chloride was removed in vacuo to give benzyl -3-(2'-hydroxyphenyl)-4-aminovalerate.

EXAMPLE 15

Preparation of t-butyl 3-(2'-hydroxyphenyl)-4 aminovalerate t-Butylacetate (25.0 g.), sodium methoxide (6.6 g.) and methyl-3-(2'-hydroxyphenyl)-4-aminvalerate (22.3 g.) were charged into a 50-ml. flask and heated under reflux with simultaneous removal of methylacetate through a reflux ratio controlled column until no more methylacetate formed. The reaction mixture was cooled to 40° C. and the excess of t-butylacetate was removed in vacuo. The residue was dissolved in water and the solution was saturated with carbon dioxide at 0°. The resulting oily precipitate was dissloved in 100 ml. of methylene chloride, washed with water and dried over MgSO$_4$. The solvent was removed in vacuo to give t-butyl-3-(2'-hydroxyphenyl)-4-aminovalerate.

We claim:
1. A compound of the formula:

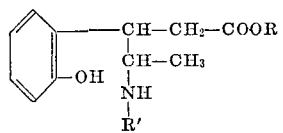

wherein R is lower-alkyl or monocyclic ar(lower-alkyl) and R' is hydrogen or p-chlorobenzoyl.
2. The compound of claim 1 wherein R is methyl.
3. The compound of claim 1 wherein R is t-butyl.
4. The compound of claim 1 wherein R is benzyl.

References Cited

UNITED STATES PATENTS 3,471,548  10/1969  Keberle et al. _____ 260—471

LORRAINE A. WEINBERGER, Primary Examiner

L. A. THAXTON, Assistant Examiner

U.S. Cl. X.R.

260—326.13, 519, 570.9, 999